(12) United States Patent
Drudy et al.

(10) Patent No.: US 8,537,962 B1
(45) Date of Patent: Sep. 17, 2013

(54) ADVANCED GRAY ROD CONTROL ASSEMBLY

(75) Inventors: Keith J. Drudy, New Kensington, PA (US); William R. Carlson, Pittsburgh, PA (US); Michael E. Conner, Elgin, SC (US); Mark Goldenfield, Columbia, SC (US); Michael J. Hone, New Alexandria, PA (US); Carroll J. Long, Jr., Columbia, SC (US); Jerod Parkinson, Lexington, SC (US); Radu O. Pomirleanu, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1080 days.

(21) Appl. No.: 12/028,119

(22) Filed: Feb. 8, 2008

(51) Int. Cl.
*G21C 7/08* (2006.01)
*G21C 7/10* (2006.01)
*G21C 7/103* (2006.01)

(52) U.S. Cl.
USPC .......................................... 376/327; 376/339

(58) Field of Classification Search
USPC ........................................................ 376/327
See application file for complete search history.

(56) References Cited

U.S. PATENT DOCUMENTS

| | | | | | |
|---|---|---|---|---|---|
| 3,117,372 | A | * | 1/1964 | McNees et al. | 29/527.1 |
| 3,250,729 | A | * | 5/1966 | Preisler et al. | 252/478 |
| 3,300,848 | A | * | 1/1967 | Leitten, Jr. et al. | 419/20 |
| 3,505,064 | A | * | 4/1970 | Mock et al. | 420/422 |
| 3,619,219 | A | * | 11/1971 | Bromer et al. | 501/50 |
| 3,725,663 | A | * | 4/1973 | Mayo et al. | 376/184 |
| 3,769,160 | A | * | 10/1973 | Shepherd et al. | 376/339 |
| 3,969,123 | A | * | 7/1976 | Holcombe et al. | 501/94 |
| 4,073,647 | A | * | 2/1978 | Morgan | 75/235 |
| 4,079,236 | A | * | 3/1978 | Graham et al. | 376/255 |
| 4,556,423 | A | * | 12/1985 | Kondo et al. | 420/40 |
| 5,064,607 | A | * | 11/1991 | Miller et al. | 376/333 |
| 5,742,655 | A | * | 4/1998 | Hertz et al. | 376/333 |
| 7,412,021 | B2 | * | 8/2008 | Fetterman et al. | 376/327 |
| 2007/0036260 | A1 | * | 2/2007 | Fetterman et al. | 376/219 |
| 2008/0144762 | A1 | * | 6/2008 | Holden et al. | 376/416 |

FOREIGN PATENT DOCUMENTS

| | | | |
|---|---|---|---|
| EP | 0 408 172 A1 | * | 4/1990 |
| EP | 0 408 172 A1 | | 1/1991 |
| JP | 05142376 A | * | 6/1993 |
| WO | WO 2007/014260 A2 | | 2/2007 |
| WO | WO 2007014260 A2 | * | 2/2007 |

OTHER PUBLICATIONS

Wallenius, J.; "Neutronic aspects of inert matrix fuels for application in ADS", 2003, Journal of Nuclear Materials 320, pp. 142-146.*
"Neutronic aspects of inert matrix fuels for application in ADS" J. Wallenius J. Nucl. Materials 320 (2003) 142-6.*
Anonymous, Tungsten, W, (drawn wire) Material Property Data, pp. 1-2, Retrieved from the internet, URL:www.matweb.com/search/datsheetText.aspx?basnum=AMEW001>.

* cited by examiner

*Primary Examiner* — Jack W Keith
*Assistant Examiner* — Sean P Burke
(74) *Attorney, Agent, or Firm* — Westinghouse Electric Company LLC; Joseph C. Spadacene (57) ABSTRACT

An advanced gray rod control assembly (GRCA) for a nuclear reactor. The GRCA provides controlled insertion of gray rod assemblies into the reactor, thereby controlling the rate of power produced by the reactor and providing reactivity control at full power. Each gray rod assembly includes an elongated tubular member, a primary neutron-absorber disposed within the tubular member said neutron-absorber comprising an absorber material, preferably tungsten, having a 2200 m/s neutron absorption microscopic capture cross-section of from 10 to 30 barns. An internal support tube can be positioned between the primary absorber and the tubular member as a secondary absorber to enhance neutron absorption, absorber depletion, assembly weight, and assembly heat transfer characteristics.

31 Claims, 5 Drawing Sheets

ADVANCED GRAY ROD CONTROL ASSEMBLY

GOVERNMENT INTEREST

This invention was made with government support under Contract No. DE-FC07-07ID14779 awarded by the Department of Energy. The government has certain rights in this invention.

BACKGROUND OF THE INVENTION

1. Field of the Invention

The present invention relates generally to nuclear reactors and, more particularly, to an advanced design of gray rod control assemblies (GRCAs).

2. Background Information

The power produced by the reactor of a nuclear power plant is generally controlled by raising or lowering control rod assemblies within the reactor core, and the change in reactor power output required in order to accommodate a change in the demand for electrical output from the electrical power plant is commonly referred to as load follow. As described, for example, in U.S. Pat. No. 4,079,236, load follow presents many operating issues. For instance, in a pressurized water reactor (PWR) during load follow, reactivity must be controlled and axial power distribution changes in the core in response to the power level change, must be addressed.

The fuel assemblies of modern reactor cores typically employ two types of rod control assemblies to control reactivity, rod cluster control assemblies (RCCAs) and gray rod control assemblies (GRCAs). Both consist of a plurality of neutron-absorbing rods fastened at their top ends to a common hub or spider assembly. The body of the rods generally comprises a stainless steel tube which encapsulates a neutron-absorbing material, such as a silver-indium-cadmium absorber material, and the rods are slid within tubular guide thimble tubes of the fuel assembly with a control drive mechanism near the top of the spider assembly operating to control the movement of the rods within the thimble tubes. In this manner, the controlled insertion and extraction of the rods generally controls the amount of power produced by the reactor. Additionally, GRCAs are used during full power operation as described below.

Typically, GRCAs are used in load follow maneuvering because they are comprised of reduced worth control rods, commonly referred to in the art as "gray" rods, and have less impact on core distribution. The term "gray" as used herein relates to the neutron absorption characteristic of the absorber rods, and refers to the fact that the GRCA is intended to absorb only a fraction of the thermal and epithermal energy neutrons entering the absorber, as opposed to "black" control rods, which are intended to absorb a large majority of such neutrons in order to shut down the reactor. Gray rods are known to provide a mechanical shim (MSHIM) reactivity control mechanism as opposed to a chemical shim, which requires changing the concentration of soluble boron in the reactor coolant. Thus, the use of gray rods minimizes the need for processing the primary reactor coolant on a daily basis and, therefore, greatly simplifies operations. This reactivity control function is used for both full power operations and during load follow. More specifically, an existing GRCA design consists of 24 rodlets fastened at their top ends to the spider. Of the 24 rodlets within the cluster, only four rods are absorber rods, and the neutron-absorber material encapsulated within the absorber rods typically consists of an alloy containing about 80% silver (Ag), about 15% indium (In), and about 5% cadmium (Cd). Such a design poses several disadvantages.

Among the disadvantages of known Ag—In—Cd GRCA designs, is the fact that indium and cadmium have relatively large neutron cross-sections, which result in their depletion over a relatively short period of time. As a result, the rod worth of such a GRCA design is reduced below an acceptable value within about five to ten years, depending on the design and amount of usage. Continued use beyond this time results in further depletion, and the GRCAs will eventually become ineffective at controlling the reactor during load follow or providing reactivity control at full power. This undesirably leads to frequent GRCA replacement. A second disadvantage relates to changes in the local rod power for fuel rods which are adjacent to the four guide thimbles that contain the absorber rods. Specifically, because the absorber material is localized to four rodlets in known designs, a relatively large change in power, commonly referred to as the delta-power of the fuel rods, occurs, for example, during a rod pull. A rod pull is the process of extracting the GRCA from the fuel assembly. In known GRCA designs, a rod pull can result in a delta-power spike in adjacent fuel rods that may be larger than allowable limits which indicate an increased risk of fuel failure. GRCA designs which are variations of known designs, and which incorporate lesser amounts of Ag—In—Cd evenly distributed among all 24 rodlets can mitigate this problem. However, such designs will also deplete at a significantly higher rate due to lower self shielding of the indium and cadmium, and will become depleted below the acceptable rod worth in less than five years. In addition, absorber swelling due to irradiation induced transmutation in silver alloy control rod designs has been a longstanding problem in the industry for many years. Specifically, exposure of silver and indium to neutron radiation results in the formation of significant amounts of cadmium and tin, which can lead to swelling due to changes in the material density. Too much swelling of the absorber can result in the absorber contacting and potentially cracking the cladding surrounding it.

The reduced worth gray rods are typically intended to have a reactivity worth significantly lower than standard (or black) RCCA control rods that are used to shut down the reactor or provide gross reactivity control capability. The targeted reactivity worth of a gray control rod may vary depending on the application and intended operating strategy of the plant. Further, the weight of a gray control rod should be similar to the weight of a black control rod that will be used in the same plant, if both the gray and black control rods have the same interfaces with other components in the reactor. The reactivity worth and weight of a gray control rod can be determined by the material(s) selected and the ultimate configuration of the rod. Typically, the use of a single absorber material does not satisfy both the weight and reactivity worth requirements. Thus, there is room for improvement in GRCA designs for nuclear reactors.

SUMMARY OF THE INVENTION

These needs and others are satisfied by the present invention, which is directed to an advanced gray rod control assembly (GRCA) design that provides an improved neutron-absorber material, an improved gray rod assembly and a distribution of gray rod assemblies which is adapted to accommodate load follow operations and to overcome known adverse conditions traditionally associated therewith.

As one aspect of the invention, a gray rod for a rod control assembly of a nuclear reactor, said gray rod comprising an elongated tubular member having a first end, a second end, an outer diameter, and a length; a neutron-absorber disposed within said elongated tubular member generally toward the first end thereof, said neutron-absorber comprising an absorber material having a 2200 m/s neutron absorption microscopic capture cross-section of from 10 to 30 barns.

As another aspect of the invention, an advanced gray rod control assembly for a nuclear reactor, said advanced gray rod control assembly comprising a plurality of gray rods wherein each of said gray rods comprises an elongated tubular member having a first end, a second end, an outer diameter, and a length, a neutron-absorber disposed within said elongated tubular member generally toward the first end thereof, said neutron-absorber comprising an absorber material having a 2200 m/s neutron absorption microscopic capture cross-section of from 10 to 30 barns.

The neutron-absorber may be distributed among all of the gray rod assemblies of the plurality of gray rod assemblies. More specifically, the advanced gray rod control assembly may include 24 gray rods wherein the neutron-absorber is distributed generally equally among all 24 gray rods of the assembly.

As yet another aspect of the invention, a nuclear reactor having a gray rod control assembly for a nuclear reactor, said gray rod control assembly comprising a plurality of gray rods wherein each of said gray rods comprises an elongated tubular member having a first end, a second end, an outer diameter, and a length, a neutron-absorber disposed within said elongated tubular member generally toward the first end thereof, said neutron-absorber comprising an absorber material having a 2200 m/s neutron absorption microscopic capture cross-section of from 10 to 30 barns.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For simplicity of disclosure, the invention will be described with reference to the pressurized water reactor (PWR) core design which is commercially known under the designation AP1000. The AP1000 is a Westinghouse Electric Company LLC reactor design. Westinghouse Electric Company LLC has a place of business in Monroeville, Pa. Reference to the AP1000 is provided for illustrative example purposes only and is not limiting upon the scope of the invention. It will, therefore, be appreciated that the exemplary GRCA design of the invention has application in a wide variety of other reactor designs.

Directional phrases used herein, such as, for example, upper, lower, top, bottom, left, right, and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall refer to one and more than one (i.e., a plurality).

Fuel Assembly

Figure 1:
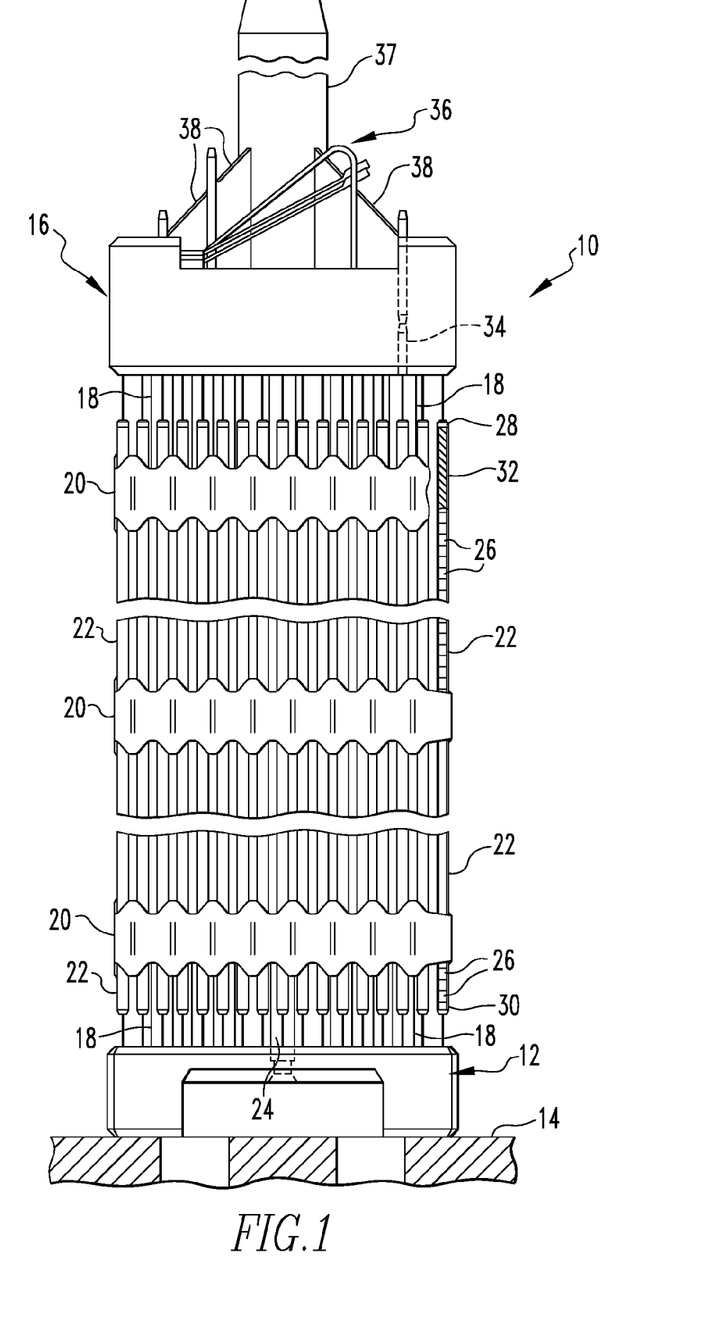
FIG. 1 is an elevational view of a fuel assembly, illustrated in vertically shortened form, and a control assembly therefore, partially shown in hidden line drawing.

Referring now to the drawings and particularly to FIG. 1, there is shown an elevational view of a nuclear reactor fuel assembly, represented in vertically shortened form and being generally designated by reference numeral 10. The fuel assembly 10 is the type used in a pressurized water reactor (PWR) and has a structural skeleton which, at its lower end, includes a bottom nozzle 12 for supporting the fuel assembly 10 on a lower core support plate 14 in the core region of the nuclear reactor (not shown), a top nozzle 16 at its upper end, and a number of guide tubes or thimbles 18 which extend longitudinally between and are rigidly attached at opposite ends, to the bottom and top nozzles 12 and 16.

The fuel assembly 10 further includes a plurality of transverse grids 20 axially-spaced along and mounted to the guide thimble tubes 18 and, an organized array of elongated fuel rods 22 transversely-spaced and supported by the grids 20. The assembly 10 also has an instrumentation tube 24 located in the center thereof and extending between and mounted to the bottom and top nozzles 12 and 16. In view of the foregoing arrangement of parts, it will be understood that the fuel assembly 10 forms an integral unit capable of being conveniently handled without damaging the assembly parts.

As previously discussed, the array of fuel rods 22 in the fuel assembly 10 are held in spaced relationship with one another by the grids 20 which are spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water or water containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly in order to extract heat generated therein for the production of useful work. To control the fission process, a number of control rods 34 are reciprocally moveable in the guide thimbles 18 located at predetermined positions in the fuel assembly 10. A spider assembly 39 positioned above the top nozzle 16 supports the control rods 34.

Figures 2A, 2B:
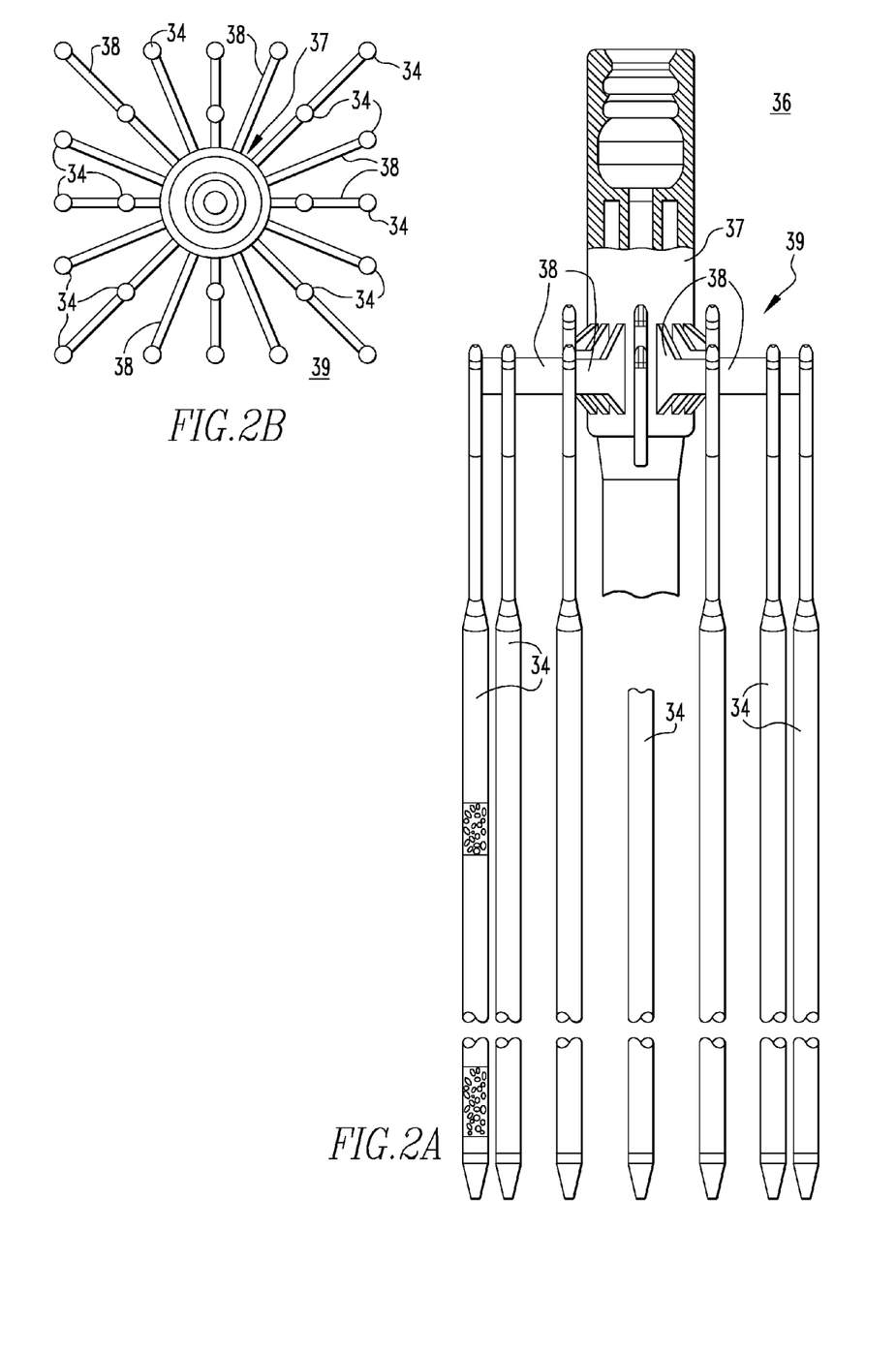
FIG. 2A is a partially sectioned elevational view of the control assembly of FIG. 1, which has been removed from the fuel assembly.
FIG. 2B is a top plan view of the control rod spider assembly for the control assembly of FIG. 2A.

FIGS. 2A and 2B show the control rod assembly 36 after it has been removed from the fuel assembly 10 of FIG. 1. Generally, the control assembly 36 has a cylindrical member 37 with a plurality of radially-extending flukes or arms 38, which comprise the spider assembly 39, best shown in FIG. 2B. As previously discussed, each arm 38 is interconnected to the control rods 34 such that the control rod assembly 36 is operable to move the control rods 34 vertically within the guide thimbles 18 (FIG. 1) to thereby control the fission process in the fuel assembly 10 (FIG. 1), all in a well known manner. With the exception of the exemplary control rod assembly which comprises an advanced gray control rod assembly (GRCA) 36 having improved gray rod assemblies 34, which will now be discussed, all of the foregoing is old and generally well known in the art.

Advanced GRCA

Continuing to refer to FIGS. 2A and 2B, the general control rod configuration will now be described. As previously stated, in order to take advantage of the MSHIM capabilities afforded by low worth or gray rods, known control rod assemblies, such as the existing control assemblies for the Westinghouse Electric Company LLC AP1000 reactor, employ GRCAs. However, while the GRCA design for the current AP1000 reactor design has 24 rods which are generally configured as shown in FIG. 2B, as mentioned hereinbefore, 20 of the 24 rods are stainless steel (e.g., without limitation, SS-304) water displacing rods and only four of the rods are neutron-absorber rods, in order to obtain the targeted low reactivity worth for the GRCA. Therefore, essentially all of the neutron-absorber material is localized and isolated in only four rod locations within the GRCA.

Additionally, in the existing AP1000 design, the absorber material comprises an Ag—In—Cd alloy absorber consisting of about 80% silver, about 15% indium, and about 5% cadmium, which will absorb a large majority of all thermal and epithermal energy neutrons that enter the absorber region. Such a neutron absorber is known in the art as a "black" absorber. This absorber material is consistent with known standard full-strength rod cluster control assemblies (RCCAs), in which all 24 rods are Ag—In—Cd. As noted, and as will be discussed herein with reference to FIG. 3, indium and cadmium are known to rapidly deplete. RCCAs spend a minimal amount of time in the core during power operation. Therefore, such depletion is not an issue. However, for the AP1000 mechanical shim (MSHIM) operation, for example, the GRCAs are expected to reside in the core for up to half of the operating cycle. Under these operating conditions, the existing GRCA design would need to be replaced about every five to ten years due to rapid absorber depletion. As will be discussed in detail herein, among other benefits, the advanced GRCA design of the invention overcomes this rapid depletion disadvantage and also substantially avoids the undesirable local power spike experienced when a traditional GRCA having four RCCA rods is pulled from the core.

Figure 3:
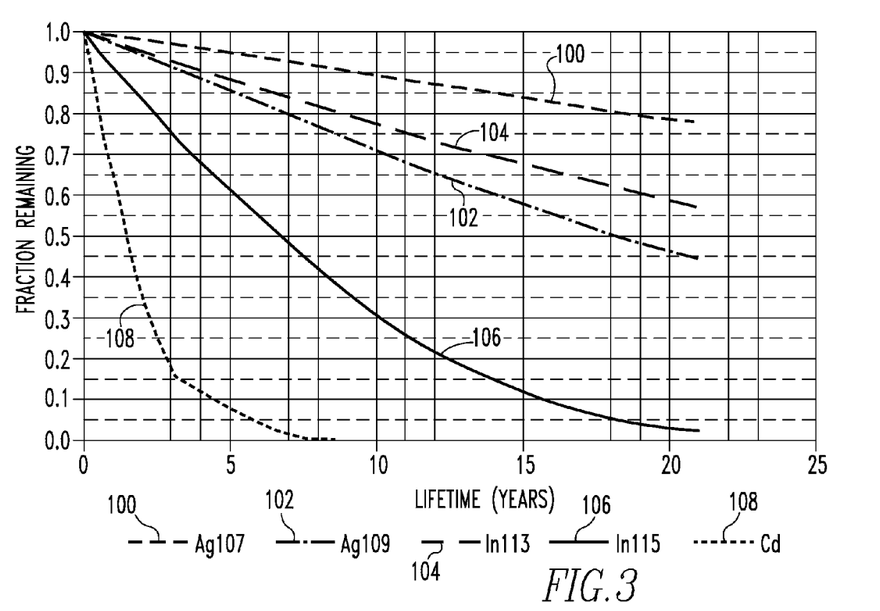
FIG. 3 is a graph plotting, for comparison, the rates of depletion for various neutron-absorber materials in a GRCA design using Ag—In—Cd alloy as the absorber.

A further understanding of the aforementioned absorber depletion issue will be had with reference to FIG. 3. FIG. 3 shows a graph of the depletion rates for two different isotopes of silver, two different isotopes of indium, and the depletion rate for cadmium. More specifically, the depletions of silver-107 (Ag-107), silver-109 (Ag-109), indium-113 (In-113), indium-115 (In-115), and cadmium (Cd) are plotted together, for comparison, as lines 100, 102, 104, 106, and 108 respectively, for a GRCA design where self shielding is minimized. As shown, both isotopes of silver 100, 102 have relatively slow depletion rates, whereas indium-115, 106 and cadmium 108 have rapid depletion rates. Specifically, the rapid depletion of indium-115, 106 and cadmium 108 result in a loss of absorption strength of about 20% after only five years of operation for this design. Changes in load follow operational characteristics can become a problem in the Westinghouse AP1000 with as little as 5% loss of GRCA absorber strength. If the initial rod worth of the GRCA design is increased to compensate for the anticipated depletion in order to extend the GRCA life time, the effect on core power distribution due to a GRCA rod pull will correspondingly increase, leading to an increased risk of fuel failures. As noted hereinbefore, rapid depletion of black neutron absorber isotopes undesirably results in reduced ability of the GRCAs to control the reactor during load follow, and ultimately leads to frequent GRCA replacement. The invention overcomes these disadvantages by employing an improved gray rod assembly design that, among other refinements, employs a different neutron-absorber material having an improved depletion in comparison with the existing Ag—In—Cd absorber.

Figure 4:
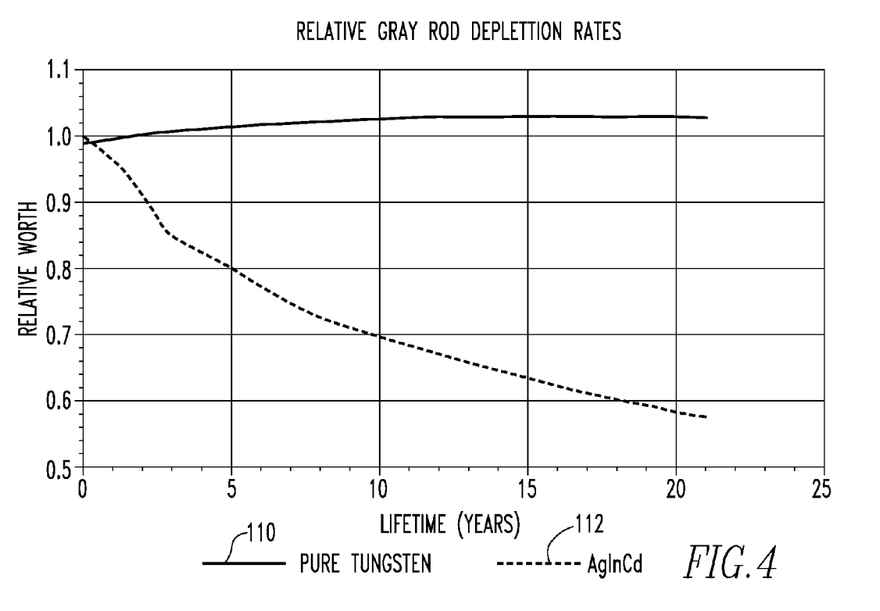
FIG. 4 is a graph plotting, for comparison, the relative reactivity worth of a tungsten absorber GRCA in accordance with the invention compared to the relative reactivity worth of an Ag—In—Cd absorber GRCA design.

Specifically, FIG. 4 shows a plot of the relative rod worth of a GRCA incorporating the exemplary absorber material 110 of the invention compared to a GRCA with the same initial worth, incorporating the existing Ag—In—Cd absorber 112. Both designs plotted in FIG. 4 incorporate an even distribution of absorber in all GRCA rodlets in order to minimize power distribution impacts. Like the graph of FIG. 3, the change in rod worth is plotted by way of relative worth versus lifetime of the absorber 110, 112, in years. It is desirable for the absorber 110 used in a GRCA to have a slowly varying or essentially flat depletion worth curve under long-term exposure to neutron irradiation. Such operation is typical for a GRCA, as opposed to a standard black RCCA that does not normally operate within the core during power operation, and therefore does not experience as much neutron irradiation. Specifically, the present invention replaces the existing Ag—In—Cd absorber 112 with absorber 110 that comprises an absorber material having a 2200 m/s neutron absorption microscopic capture cross-section of from 10 to 30 barns. The relative absorption capability in the epithermal and fast neutron energy ranges, as well as the absorption cross section characteristics of the resulting depletion products, can be also considered in selecting the exemplary absorber material for a GRCA. The absorber 110 material can be arranged in a cylindrical geometry within the GRCA rodlet. Further, the absorber 110 can be segmented axially, or it may be a solid piece covering up to the entire axial length of the cylinder. Non-limiting examples of suitable absorber materials can include but are not limited to substantially pure tungsten at near or full theoretical density; reduced density or porous tungsten metal; tungsten-based alloys such as tungsten-rhenium and tungsten-nickel-iron; tungsten-based compounds such as tungsten carbide; substantially pure scandium, ytterbium and manganese; scandium-, ytterbium- and manganese-based alloys, and scandium-, ytterbium- and manganese-based compounds. As used herein, the phrases "substantially pure" and "pure" are used interchangeably to refer to an absorber that is almost entirely composed of the element (e.g., tungsten, scandium, ytterbium or manganese), wherein any impurities that are present in the absorber are in such low quantities as to be generally negligible. The plot of relative rod worth behavior shown in FIG. 4 for the exemplary absorber 110 is for a GRCA based on using pure tungsten as the primary neutron absorber.

The use of the absorber material 110 in the present invention, e.g., tungsten, instead of an alternate absorber material such as, for example, silver, silver-indium-cadmium, boron, hafnium and the like, results in at least one of the following benefits. The relatively low capture cross section for tungsten results in slow depletion of the absorber relative to other black absorbers. The rod worth of a tungsten based 110 GRCA design remains relatively stable with a slight increasing trend occurring initially, as shown in FIG. 4, due to the creation of rhenium-187. The rhenium-187 is created as a result of neutron absorption in tungsten-186 and the subsequent beta decay of tungsten-187. The neutron absorption cross section of rhenium-187 is larger than the parent isotope, and compensates nearly equally for the slow depletion of all absorbing isotopes initially present in the tungsten, does not negatively impact the neutron absorption, and therefore the usefulness, of the GRCA. It is calculated that the tungsten absorber worth will increase by about 3% to 5% over a 20-year in-core irradiation history, after which the worth will begin to slowly decrease. Other potential absorbers based on scandium, ytterbium or manganese, would also be expected to have relatively flat depletion worth characteristics in a GRCA due to the low neutron capture cross section. However, these materials are not known to transmute into any strong neutron absorber isotopes, and would therefore likely show a monotonic decrease in rod worth versus time. With the tungsten absorber, transmutation reactions which result in significant changes in material properties over the design lifetime of the gray rod may be minimized. Long-term neutron irradiation of pure tungsten will produce a tungsten-rhenium alloy which has close to the same neutron capture cross section and material properties as the original material. The flat depletion worth curve of tungsten allows for the initial design of the gray rod to match an ideal target rod worth, without having to over-design the rod worth to compensate for absorber depletion effects, which can be as high as 20% or more with a black absorber material. A gray rod that is designed to the ideal target rod worth and not over-designed by 20% or more can result in less risk of causing pellet to clad interaction related fuel failures in the reactor (due to lower delta-power in the fuel rods), and thus less radioactivity in the reactor coolant. Tungsten will not swell like Ag—In—Cd absorbers, thus eliminating clad cracking concerns associated with Ag—In—Cd designs. Moreover, tungsten has a significantly higher melting point than that of silver-indium-cadmium (6192° F. and 1472° F., respectively) which can result in improved accident survivability. As a result, it is believed that tungsten absorber will deform less under reactor operating conditions than, for example, a silver or silver alloy absorber. Additionally, it is believed that the activation of tungsten in-reactor may result in a significantly lower radioactive source term as compared to silver.

In one embodiment of the present invention, wherein the absorber material includes substantially-pure tungsten at near or full theoretical density; tungsten-based alloys such as tungsten-rhenium and tungsten-nickel-iron; tungsten-based compounds such as tungsten carbide; substantially pure scandium, ytterbium and manganese; scandium-, ytterbium- and manganese-based alloys, and scandium-, ytterbium- and manganese-based compounds, the absorber 110 has a material density of from 16.5 to 19.4 g/cm$^3$. In one embodiment, wherein the neutron-absorber is for the AP1000 application, an absorber material, such as substantially pure tungsten, is used having a material density of approximately 19.3 g/cm$^3$. Further, for the AP1000 application, a material is used having a 2200 m/s neutron absorption microscopic capture cross-section of from 10 to 30 barns.

As shown in FIG. 4, the use of a of tungsten absorber 110 significantly reduces the depletion rate of the absorber, extending the useful nuclear lifetime of the improved GRCA 36 (FIG. 2A) to greater than 20 years. Not only is this a dramatic improvement over the aforementioned useful lifetime of only about five to ten years for the existing Ag—In—Cd absorber, but the exemplary absorber 110 worth remains relatively constant, as opposed to the rapid depletion of the Ag—In—Cd absorber 112. The extended useful life of the exemplary absorber 110 allows the improved GRCA 36 (FIG. 2A) to meet demanding control rod lifetime requirements.

Figure 5:
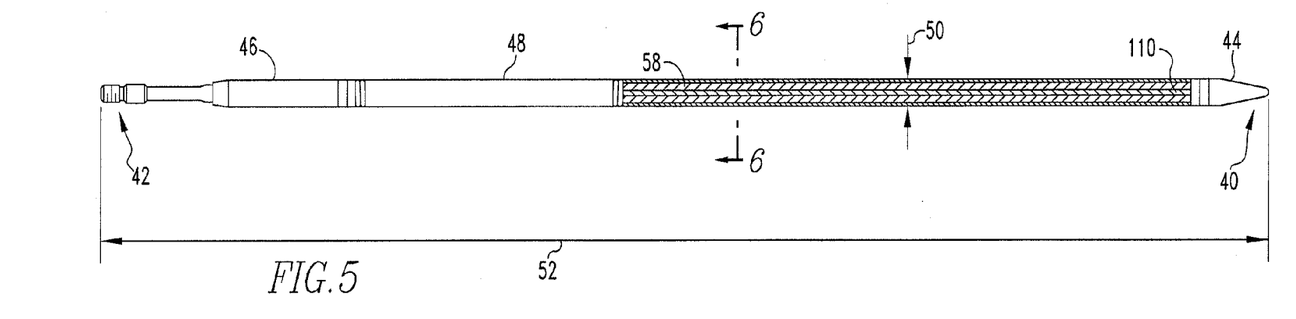
FIG. 5 is a partially sectioned elevational view of an advanced gray rod assembly in accordance with the invention.
Figure 6:
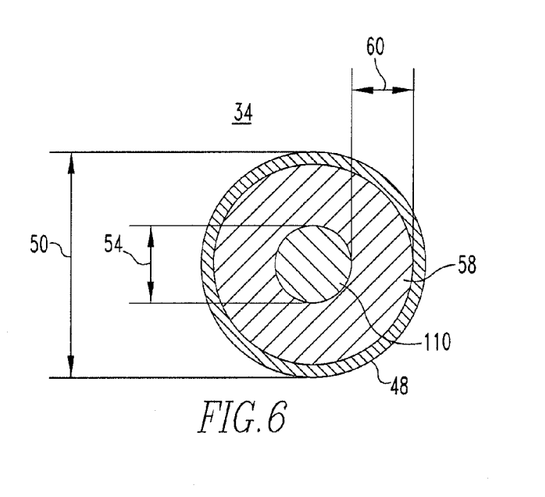
FIG. 6 is a cross-sectional view taken along line 6-6 of FIG. 5.

FIGS. 5 and 6, show the advanced gray rod assembly 34 of the invention. As shown in FIG. 5, the gray rod assembly 34 generally includes a first end 40 which, as oriented in the core (FIG. 1), is the bottom end, and a second end 42 (e.g., top end from the prospective of FIG. 1). The first or bottom end 40 has a tapered end plug 44. Such tapered design facilitates guided insertion of the rod 34 into the thimble tube 18 (FIG. 1) of the fuel assembly 10 (FIG. 1). The second or top end 42 has a top end plug 46 which is structured to engage and secure to the spider assembly 39 (best shown in FIG. 2A) in a known manner (e.g., without limitation, a complementary male/female threaded fastening arrangement). An elongated tubular member 48 extends between the top and bottom end plugs 46, 44. The exemplary tubular member is a stainless steel tube 48 made from 304-stainless steel, although tubes made from other known or suitable alternative materials are contemplated such as but not limited to zirconium and nickel-base alloys. In the example shown and discussed herein, the outer diameter 50 of the tube 48 is about 0.38 inches (0.97 centimeters) and the overall length 52 of the rod 34, from the top of the bottom end plug 44 to the bottom of the top end plug 46, is about 175 inches (444.5 centimeters). However, it will be appreciated that the concepts of the invention are equally applicable for rods having any suitable length and width for use in a wide variety of reactors.

In one embodiment of the present invention, the absorber 110 is contained within the elongated tubular member 48 and is dimensioned to substantially fill the internal diameter of the tubular member 48. In one embodiment, the outer diameter of the absorber 110 is from 0.15 to 0.40 inch; the outer diameter of the tubular member 48 is from 0.37 to 0.45 inch. In another embodiment, such as for use with the AP1000, the outer diameter of the absorber 110 is from 0.17 to 0.35 inch; the outer diameter of the tubular member 48 is from 0.37 to 0.39 inch. The absorber 110 can include reduced density or porous tungsten metal; tungsten-based alloy, or a tungsten-based compound.

As shown in FIG. 5, the absorber material 110 is generally disposed within the elongated tubular member 48. Also shown in FIG. 5, the absorber 110 can be double-encapsulated, first by an internal support tube 58 and then by the elongated tubular member 48. The internal support tube 58 is structured as a sleeve to substantially surround and encapsulate the absorber 110, and the elongated tubular member 48, i.e., cladding, isolates the absorber 110 and support tube 58 from the primary coolant water. The internal support tube 58 is constructed of a metal having good mechanical strength and thermal conductivity characteristics at the expected operating conditions. Further, the melting point should be high enough to support continued integrity in the environment next to the absorber material. Suitable materials for the support tube 58 can include but are not limited to zirconium and zirconium-based alloys; aluminum and aluminum-base alloys; nickel-based alloys such as Alloy 718 (UNS N07718) and Alloy 625 (UNS N06625); and stainless steel such as SS-304L and SS-316L. The internal support tube 58 is capped at both ends to provide isolation of the absorber 110 in case of a breach in the elongated tubular member 48. The support tube 58 can also facilitate heat transfer out of the absorber 110 and provide structural support to the absorber 110.

In one embodiment of the invention, the internal support tube 58 can be constructed from a secondary absorber material that may be selected to enhance neutron absorption and/or optimize rodlet weight, in addition to facilitating heat transfer and providing structural support. The secondary absorber can have a lower capture cross-section than that of the absorber 110, i.e., the primary absorber. The secondary absorber may have a 2200 m/s neutron absorption microscopic capture cross section of from 2 to 6 barns. Further, the secondary absorber may have a density of from 7 to 9 g/cm$^3$. Non-limiting examples of suitable secondary absorber materials can include but are not limited to nickel-based metal alloys such as Alloy 718 (UNS N07718) and Alloy 625 (UNS N06625); and stainless steel such as SS-304L and SS-316L.

Without being bound by any theory, it is believed that the lower neutron capture cross-section of the secondary absorber serves to counter-balance the higher neutron capture cross-section of the primary absorber. Similarly, the lower density of the secondary absorber serves to counter-balance the higher density of the primary absorber. By manipulating the relative proportions and materials selected for the primary and secondary absorbers, it is possible to obtain a GRCA design that simultaneously optimizes both the rod worth and weight to targeted values, while at the same time significantly improving heat transfer characteristics. The sleeve and/or the cladding can be filled with an inert gas such as but not limited to helium or argon, to prevent oxidation of the primary absorber at high operating temperatures, and further improve heat transfer. In the sleeve or the cladding, the primary absorber can be in the form of a stack of right circular cylinders, a single cylinder or particles (e.g., powder).

The neutron-absorber of the present invention may be substantially concentrically disposed within the elongated tubular member 48. The neutron-absorber of the present invention also may be substantially concentrically disposed within the support tube 58 and the support tube may be within the tubular member 48. The support tube 58 can have a wall thickness which is substantially defined by the space between the outer diameter of the absorber 110 and the inner diameter of the elongated tubular member 48. As shown in the cross-sectional view of FIG. 6, the diameter 54 of the exemplary absorber 110 is less than the outer diameter 50 of the rod tube 48.

The support tube 58 has a wall thickness 60 which can be greater than the thickness of the wall of tube 48. The support tube 58 can serve to replace a part of the diametral gap between the primary absorber and the outer cladding with a high thermal conductivity material, thus facilitating heat transfer out of the primary absorber to the coolant and significantly reducing operating temperatures in the gray rod. The support tube 58 can also support and encapsulate the primary absorber to reduce the likelihood of any redistribution of the primary absorber or likelihood of release of the primary absorber to the coolant in the unlikely event of a failure in the outer clad.

In one embodiment, the outer diameter of the absorber 110 is from 0.10 to 0.38 inch; the outer diameter of the tubular member 48 is from 0.37 to 0.45 inch; and the wall thickness of the support tube 58 is from 0.01 to 0.10 inch. In another embodiment, such as for use with the AP1000, the outer diameter of the absorber 110 is from 0.16 to 0.24 inch; the outer diameter of the tubular member 48 is from 0.37 to 0.39 inch; and the wall thickness of the support tube 58 is from 0.05 to 0.07 inch.

Accordingly, the exemplary gray rod assemblies 34 of the invention provide an extended nuclear lifetime through use of the absorber materials described herein. The overall GRCA design 36 of the invention also generally improves linear heat rate margins during rod maneuvers. Specifically, the exemplary GRCA distributes the absorber 110 over all 24 rods 34 of the control assembly 36 as opposed to localizing the absorber in only four rods, as in the existing AP1000 design discussed hereinbefore. Distributing the absorber 110 among all of the GRCA rods 34 reduces the change in local fuel rod power (delta-power) when the GRCA 36 is removed from the core, which in turn improves operating margins. Specifically, distributing the absorber material 110 over all 24 rods reduces the mount of absorber 110 in each rod 34, which reduces the magnitude of the local reactivity change near each rod 34 during a rod pull. The exact amount of the reduction in amount of absorber material 110, as compared with the four Ag—In—Cd absorbers of the current design, is not meant to be limiting upon the invention.

In view of the foregoing, the exemplary gray rod assemblies 34 have been redesigned to include a combination of improved features such as a support tube 58, an entirely different absorber material comprising a combination of a primary absorber encapsulated by a secondary absorber material, the reduced amount of high neutron absorber material, and distribution of the absorber among all of the rods 34. Accordingly, the GRCA 36 of the invention addresses and substantially overcomes the aforementioned disadvantages known in the art by reducing the amount of neutron-absorber material 110 per rod 34, and by substantially evenly distributing the absorber material 110 among all of the gray rods 34 of the assembly 36. The advantages of the exemplary advanced GRCA design 36 will be further understood and appreciated with reference to FIGS. 7 and 8.

Figure 7:
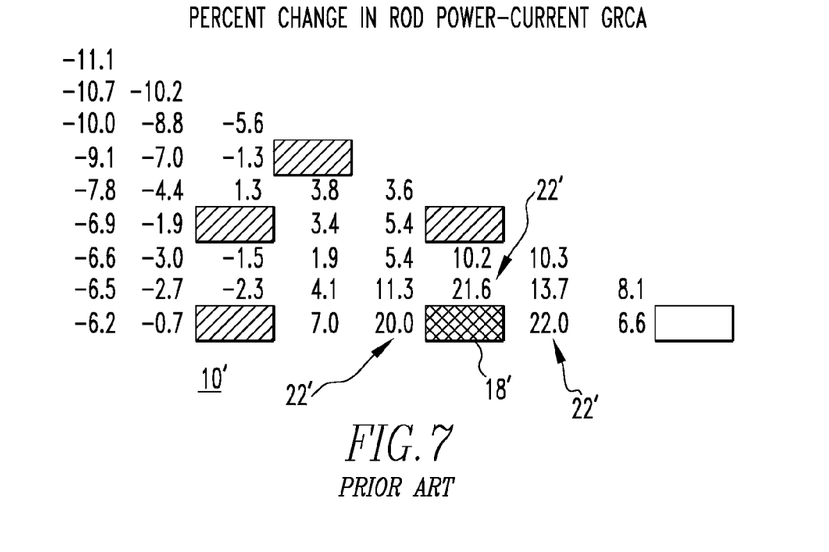
FIG. 7 is a schematic diagram of one-eighth of a fuel assembly, showing the change in rod power after the prior art GRCA has been removed from the core during a rod pull.
Figure 8:
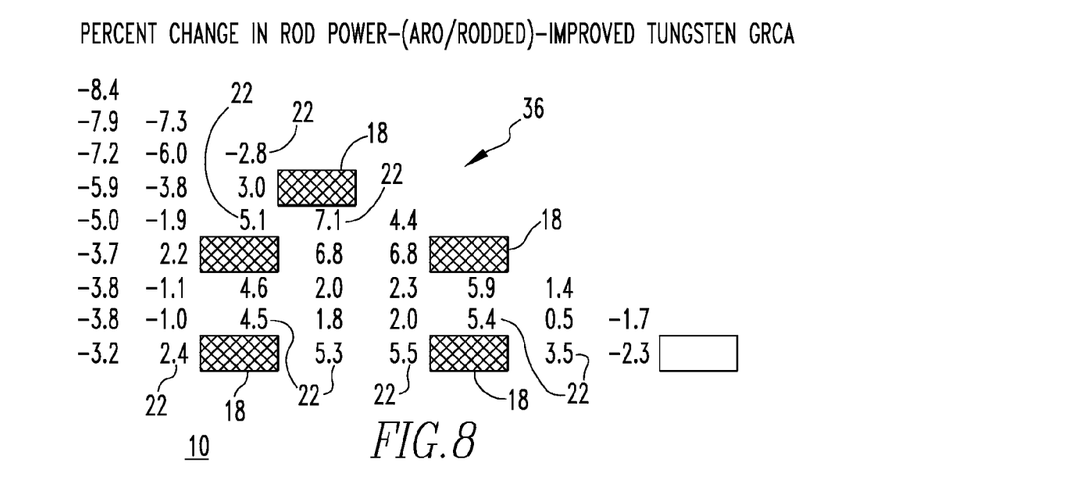
FIG. 8 is a schematic diagram of one-eighth of a fuel assembly showing the change in rod power of the fuel assembly, which employs the advanced GRCA of the invention, shown after the GRCA has been removed from the core.

FIG. 7 is a schematic or simplified view of one-eighth of a conventional fuel assembly 10' which shows, for purposes of comparison with the exemplary design of FIG. 8, the relatively large increase in local power experienced by the fuel rods 22' surrounding the thimble 18' that previously contained the absorber rods (not shown in FIG. 7), when the conventional GRCA (not shown) is withdrawn from the fuel assembly 10'. The numbers shown in FIG. 7 represent the percent change in rod power in response to the GRCA being pulled from the fuel assembly 10'. The adverse effects of the known, localized absorber are shown. Specifically, as shown, the fuel rods 22' adjacent the thimble 18' that housed the Ag—In—Cd absorber experience an isolated or localized spike in power change. As previously discussed, such a dramatic change in power is undesirable as it produces an increased risk of fuel failure due to pellet to clad interaction.

FIG. 8 confirms that the GRCA design 36 (FIG. 2) of the invention overcomes these problems. Specifically, comparing FIG. 8 with FIG. 7, the same one-eighth section of the fuel assembly 10 is shown following a rod pull operation wherein the exemplary GRCA 36 (FIG. 2) and gray rods 34 (FIGS. 2, 5 and 6) have been pulled from the fuel assembly 10. As shown, the change in rod power surrounding the thimbles 18 that housed the absorber rods (not shown in FIG. 8) is substantially reduced in comparison with the values of the example of FIG. 7. Specifically, as shown in the example of FIG. 8, the greatest percent change in rod power for the GRCA 36 of the invention is about 7%. This is a significant improvement over the percent change in rod power of about 22% for the conventional GRCA design depicted in FIG. 7.

As discussed hereinbefore this improvement is, in large part, attributable to the exemplary distribution of the absorber rods 34 (not shown in FIG. 8) among all 24 thimble locations 18, as opposed to only four thimble locations 18' total. For example, there is only one absorber location 18' shown in the one-eighth portion of the fuel assembly 10' of FIG. 7 whereas the absorber locations 18 are shown in the exemplary design of FIG. 8. In summary, the combination of the absorber 110, the reduced absorber size per rod 34, the absorber support tube 58, and the distribution of the absorber 110 throughout all of the rods 34 of the GRCA 36 of the invention, result in reducing the neutron absorption capability of each rod 34 of the GRCA 36 to about one-sixth, which thereby reduces the change in local rod power (delta-power) when, for example, the GRCA 36 is pulled from the assembly 10. It will be appreciated that the advanced features of the GRCA 36 of the invention may be employed individually or in any known or suitable combination. For example, without limitation, an alternative absorber material other than the exemplary absorber 110 discussed herein, could be employed in the exemplary reduced size, distributed configuration of the invention, without departing from the scope of the invention.

The absorber rod linear heating rate for a design using Ag—In—Cd in a reduced number of rods (4 out of 24) may lead to bulk boiling of the coolant water between the inside surface of the thimble tube 18 and the outer surface of the elongated tube 48. Distribution of the absorber material 110 to all 24 rods of a control assembly minimizes or prevents the occurrence of thimble bulk boiling.

Accordingly, the invention provides an advanced GRCA 36 that, among other benefits, exhibits an improved depletion rate, resistance to large changes in local power distribution during a rod pull, resistance to thimble bulk boiling, and improved resistance to absorber alloy swelling and clad cracking.

CONCLUSION

The present invention relates to an improved design for a low worth, or gray rod control assembly (GRCA) for a nuclear reactor. GRCAs are used in advanced nuclear reactor concepts to provide a fine reactivity control capability via mechanical means, for purposes of controlling the amount of power produced by the reactor. A typical GRCA includes a spider assembly structured to provide for controlled insertion or withdrawal of up to 24 gray rodlet assemblies into the guide thimble tubes of a fuel assembly located in the nuclear reactor core. The improved GRCA design of the present invention incorporates the use of a plurality of improved gray rodlet assemblies, which contain a novel combination and arrangement of neutron absorber and structural materials. Improved gray rodlet assemblies are used in all available rodlet locations within the GRCA in order to achieve the required reactivity worth and component weight, while minimizing local power distribution impacts of GRCA movement on fuel rods within the fuel assembly.

Each improved gray rodlet assembly incorporates the use of a gray primary neutron absorber material supported by an internal support tube inside of an external cladding. The primary neutron absorber is comprised of substantially pure tungsten, or a material with similar neutron absorption cross section and density characteristics, arranged in a cylindrical geometry. Tungsten is a preferred primary neutron absorber material for gray control rod applications because it has a neutron absorption cross section in the targeted range, and experiences very little change in reactivity worth with time due to absorber depletion effects under long term exposure to neutron irradiation. Tungsten also has a very high material density and melting temperature, low activation potential, and is less prone to irradiation induced swelling than other more commonly used black neutron absorber materials. Tungsten based alloys or compounds incorporating other elements may also be considered for use as the primary neutron absorber in the improved design. An elongated tubular member known as the internal support tube supports and confines the primary neutron absorber. The internal support tube is comprised of a nickel alloy, stainless steel, zirconium alloy, or other similar structural material with experience in the nuclear industry, which will produce no adverse consequence if exposed to reactor coolant. The internal support tube is intended primarily to facilitate heat transfer, provide structural support, and prevent redistribution or escape of the primary neutron absorber material in the event of a failure in the external cladding. However, the neutron absorption cross section and density of the internal support tube can also be used to optimize the total neutron absorption capability and attain a targeted weight for the gray rodlet assembly in cases where these parameters must be closely controlled. Both the internal support tube and the primary neutron absorber are contained within an elongated tubular member known as the external cladding. The external cladding is typically stainless steel, but may also be comprised of a nickel alloy or other similar structural material with experience in the nuclear industry, which has been successfully used in applications involving long term exposure to reactor coolant. The dimensioning and selection of materials for the primary neutron absorber, internal support tube and external cladding allow for simultaneous optimization of the reactivity worth, total component weight, and heat transfer characteristics of the improved gray rodlet assembly.

In cases where reliable long term integrity of the primary neutron absorber and external cladding can be established, another embodiment of the gray rodlet assembly can be employed which eliminates the use of an internal support tube. This alternative form can be made to achieve the required reactivity worth and heat transfer characteristics, while simplifying the manufacturing process, at the expense of not optimizing the total component weight. Suitable materials for use as the primary neutron absorber in the alternative form can include, but are not limited to various tungsten metal alloys, such as, but not limited to, tungsten-rhenium or tungsten-nickel-iron, tungsten-based compounds, such as, but not limited to, tungsten carbide, or a reduced density form of pure tungsten metal. Depending on the material selected, the outer diameter of the neutron absorber can vary. There may be a relatively small or large radial gap between the outer diameter of the absorber and the inner diameter of the external cladding. In one embodiment, wherein a more dilute primary neutron absorber material is used, the outer diameter of the absorber can nearly fill the inner diameter of the external cladding.

The primary neutron absorber material for use in the present invention can include a material with a 2200 m/s neutron absorption microscopic capture cross section of from 10 to 30 barns, arranged in a cylindrical geometry. The absorber material can have a slowly varying or flat depletion worth curve under long term exposure to neutron irradiation, which is a characteristic need of GRCA operation that can be used to distinguish it from a standard black RCCA that does not see nearly as much neutron irradiation. The primary absorber may be segmented axially, or it may be a solid piece covering up to substantially the entire axial length of the cylinder. Suitable materials for use in the primary neutron absorber can include the following:

A.) Substantially pure tungsten metal at or near full theoretical density;

B.) Alloys containing substantial amounts of tungsten and other metals, such as, but not limited to, W—Re and W—Ni—Fe;

C.) Chemical compounds containing tungsten and other elements, such as, but not limited to, tungsten carbide;

D.) Substantially pure scandium (Sc), ytterbium (Yb), or manganese (Mn); and

E.) Chemical compounds or alloys containing Sc, Yb, or Mn.

These materials can be used as the primary neutron absorber in embodiments, wherein the absorber is contained within an internal support tube and cladding or wherein the absorber is contained only within the cladding without the presence of a support tube. Further, wherein a support tube is not used, the primary neutron absorber can also include reduced density or porous tungsten metal, i.e., the density being less than the theoretical density.

The use of tungsten-based absorbers in gray rod applications can result in at least one of the following benefits:

A.) Relatively low capture cross section for tungsten can result in slow depletion of the absorber relative to other black absorbers, e.g., Ag—In—Cd, Boron, Hafnium;

B.) Long term neutron irradiation of tungsten tends to produce a tungsten-rhenium alloy, which can have close to the same neutron capture cross section as the original material, resulting in a relatively flat depletion worth curve with time;

C.) The flat depletion worth curve can allow optimization of the gray rod design to a target rod worth without "over-designing" the rod worth to compensate for absorber depletion effects, which can be as high 20% or more with a black absorber material;

D.) A gray rod design that is optimized to the target rod worth and not over-designed by 20% or more will have less risk of causing pellet-to-clad-interaction-related fuel failures in the reactor, due to lower "delta-power" in the fuel rods, and ultimately can lead to less radioactivity in the reactor coolant;

E.) The high material density of tungsten can allow higher weight gray rod designs which are less likely to experience incomplete rod insertion events; and F.) The very high melting temperature of tungsten can lead to better accident survivability as well as reduced design constraints due to thermal considerations.

The internal support tube for use in the present invention can include a structural material that has prior nuclear industry experience and is known to produce no adverse consequence if exposed to reactor coolant. The support tube material can be a metal with good mechanical strength and thermal conductivity characteristics at the expected operating conditions. The allowed service temperature should be high enough to support continued integrity in the environment next to the absorber material. In the embodiment wherein the material is selected to optimize the total neutron absorption capability and attain a targeted weight for the gray rod assembly, a material with a combined 2200 m/s neutron absorption microscopic capture cross section of from 2 to 6 barns, and a density of from 7 to 9 g/cm$^3$ is also desirable. The internal support tube can be capped at both ends to provide isolation of the primary neutron absorber in case of a breach in the external cladding. Suitable materials for use as the internal support tube can include the following:

A.) Nickel-based alloys, including, but not limited to, Alloy 718 (UNS N07718) and Alloy 625 (UNS N06625);

B.) Stainless steels, including, but not limited to, SS-304L and SS-316L;

C.) Zirconium-based alloys; and

D.) Aluminum metal.

The zirconium-based alloys and aluminum metal are typically not used in the embodiment wherein the support tube material is being relied upon to optimize the total neutron absorption capability and attain a targeted weight for the gray rod assembly.

The use of the materials described herein for the internal support tube can result in at least one of the following benefits:

A.) The cross section and density characteristics of the internal support tube material can provide the designer with another degree of freedom, which allows for development of a gray rodlet design that simultaneously optimizes reactivity worth, rod weight, and heat transfer characteristics;

B.) The internal support tube can enhance heat transfer out of the primary neutron absorber by filling in much of the internal gap between the absorber and the external cladding with a high thermal conductivity material, thereby effectively lowering absorber operating temperatures;

C.) The internal support tube can provide a second barrier between the reactor coolant and the primary neutron absorber, in addition to the external cladding, the additional barrier providing a higher level of confidence that the absorber will not ultimately come in contact with the coolant, which can lead to greater flexibility in the type of materials that can ultimately be considered for the primary absorber; and D.) The internal support tube can minimize potential redistribution of the primary neutron absorber material in the event of embrittlement of the absorber.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A gray rod for a rod control assembly of a pressurized water nuclear reactor, said gray rod comprising:
    an elongated tubular member having a first end, a second end, an outer diameter, and a length; and
    a neutron-absorber having an outer diameter and a length extending from a first end to a second end, disposed within said elongated tubular member over at least a portion of said length of said elongated tubular member, generally toward the first end thereof, said neutron-absorber comprising only one absorber material, said only one absorber material having a 2200 m/s neutron absorption microscopic capture cross-section of from 10 to 30 barns,
    wherein neutron absorption is substantially uniform over said length of said neutron-absorber.

2. The gray rod of claim 1 wherein said absorber material is selected from the group consisting of substantially-pure tungsten at near or full theoretical density; reduced density or porous tungsten metal; tungsten-based alloys such as tungsten-rhenium and tungsten-nickel-iron; tungsten-based compounds such as tungsten carbide and tungsten oxides; substantially pure scandium, ytterbium and manganese; scandium-, ytterbium- and manganese-based alloys, and scandium-, ytterbium- and manganese-based compounds.

3. The gray rod of claim 1 wherein said absorber material is arranged in a cylindrical geometry.

4. The gray rod of claim 1 wherein the neutron-absorber has a material density of from 16.5 to 19.4 g/cm$^3$.

5. The gray rod of claim 1 wherein the neutron-absorber is substantially pure tungsten.

6. The gray rod of claim 1 wherein the outer diameter of the neutron-absorber is from 0.15 to 0.40 inch and the outer diameter of the elongated tubular member is from 0.37 to 0.45 inch.

7. The gray rod of claim 1 further comprising a support tube structured to surround said neutron-absorber within said elongated tubular member.

8. The gray rod of claim 7 wherein the support tube comprises a material selected from the group consisting of zirconium and zirconium-based alloys, aluminum metal, nickel-based alloys and stainless steel.

9. The gray rod of claim 7 wherein the support tube material is selected to enhance neutron absorption of the gray rod.

10. The gray rod of claim 7 wherein the support tube material has a lower 2200 m/s neutron absorption microscopic capture cross section than the neutron-absorber.

11. The gray rod of claim 9 wherein the support tube material has a 2200 m/s neutron absorption microscopic capture cross section of from 2 to 6 barns.

12. The gray rod of claim 9 wherein the support tube material has a density of from 7 to 9 gm/cm$^3$.

13. The gray rod of claim 9 wherein the support tube material is selected from the group consisting of nickel-based metal alloys and stainless steel.

14. The gray rod of claim 7 wherein the outer diameter of the neutron-absorber is from 0.10 to 0.38 inch, the outer diameter of the elongated tubular member is from 0.37 to 0.45 inch and the support tube has a wall thickness of from 0.01 to 0.10 inch.

15. The gray rod of claim 7 wherein said neutron-absorber is substantially concentrically disposed within said elongated tubular member; and wherein said support tube has a wall thickness which is substantially defined by the space between the second outer diameter and the inner diameter of said elongated tubular member.

16. An advanced gray rod control assembly for a pressurized water nuclear reactor, said advanced gray rod control assembly comprising:
a plurality of gray rods wherein each of said gray rods comprises:
an elongated tubular member having a first end, a second end, and an outer diameter; and
a neutron-absorber having a length extending from a first end to a second end, disposed within said elongated tubular member toward the first end thereof, said neutron-absorber comprising only one absorber material, said only one absorber material having a 2200 m/s neutron absorption microscopic capture cross-section of from 10 to 30 barns,
wherein neutron absorption is substantially uniform over said length of said neutron-absorber.

17. The advanced gray rod control assembly of claim 16 wherein said neutron-absorber is distributed among all of said gray rods of said plurality of gray rods.

18. The advanced gray rod control assembly of claim 17 wherein said plurality of gray rods comprises 24 gray rods; and wherein said neutron-absorber is distributed generally equally among all 24 gray rods.

19. The advanced gray rod control assembly of claim 16 wherein said absorber material is selected from the group consisting of substantially-pure tungsten at near or full theoretical density; reduced density or porous tungsten metal; tungsten-based alloys such as tungsten-rhenium and tungsten-nickel-iron; tungsten-based compounds such as tungsten carbide and tungsten oxides; substantially pure scandium, ytterbium and manganese; scandium-, ytterbium- and manganese-based alloys, and scandium-, ytterbium- and manganese-based compounds.

20. The advanced gray rod control assembly of claim 16 wherein the neutron-absorber is substantially pure tungsten.

21. The advanced gray rod control assembly of claim 16 wherein the neutron-absorber has a material density of from 16.5 to 19.4 g/cm$^3$.

22. The advanced gray rod assembly of claim 16 further comprising a support tube structured to surround said neutron-absorber within said elongated tubular member.

23. The advanced gray rod control assembly of claim 22 wherein the support tube comprises a material selected from the group consisting of zirconium and zirconium-based alloys, aluminum metal, nickel-based alloys and stainless steel.

24. The advanced gray rod control assembly of claim 22 wherein the support tube material has a 2200 m/s neutron absorption microscopic capture cross section of from 2 to 6 barns.

25. The advanced gray rod control assembly of claim 22 wherein the support tube material has a density of from 7 to 9 gm/cm$^3$.

26. The advanced gray rod control assembly of claim 23 wherein the support tube material is selected from the group consisting of nickel-based metal alloys and stainless steel.

27. A pressurized water nuclear reactor having a gray rod control assembly, said gray rod control assembly comprising:
a plurality of gray rod assemblies;
a plurality of gray rods, wherein each of said gray rods comprises:
an elongated tubular member having a first end, a second end, and an outer diameter; and
a neutron-absorber having a length extending from a first end to a second end, disposed within said elongated tubular member generally toward the first end thereof, said neutron-absorber comprising only one absorber material, said only one absorber material having a 2200 m/s neutron absorption microscopic capture cross section of from 10 to 30 barns,
wherein neutron absorption is substantially uniform over said length of said neutron-absorber.

28. The nuclear reactor of claim 27 wherein said neutron-absorber is distributed among all of said gray rod assemblies of said gray rod control assembly.

29. The nuclear reactor of claim 28 wherein said plurality of gray rod assemblies comprises 24 gray rod assemblies; and wherein said neutron-absorber is distributed generally equally among all 24 gray rod assemblies of said gray rod control assembly.

30. The nuclear reactor of claim 27 further comprising a support tube structured to surround said neutron-absorber within said elongated tubular member.

31. A gray rod for a rod control assembly of a pressurized water nuclear reactor, said gray rod comprising:
an elongated tubular member having a first end, a second end, and a length; and
only one neutron-absorber material disposed within said elongated tubular member over at least a portion of said length of said elongated tubular member, generally toward the first end thereof, said only one neutron-absorber material selected from the group consisting of a substantially pure material, reduced density or porous material metal, material-based alloy and material-based compound, said only one neutron-absorber material having a 2200 m/s neutron absorption microscopic capture cross-section of from 10 to 30 barns.

\* \* \* \* \*